Figure 1:
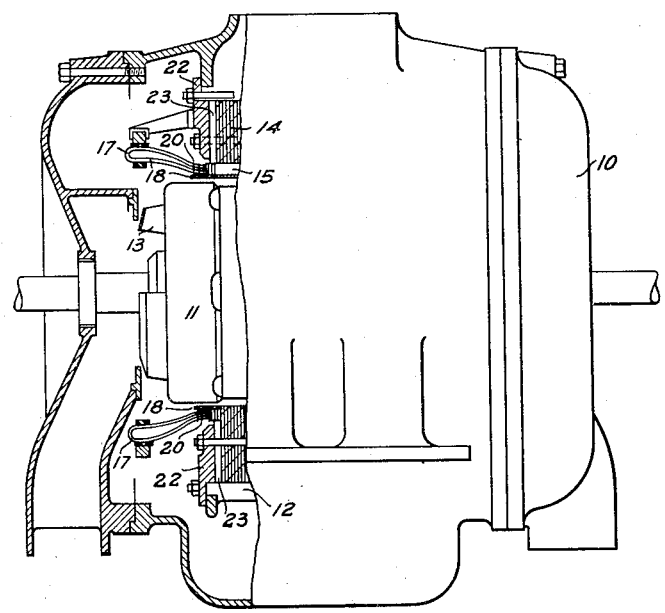

R. B. WILLIAMSON.
DYNAMO ELECTRIC MACHINE.
APPLICATION FILED JULY 28, 1911.

1,157,137.

Patented Oct. 19, 1915.

Witnesses
Rob. E. Stoll.
Chas. L. Byron.

Inventor
Robert B. Williamson.
By Chas. E. Lord
Attorney

UNITED STATES PATENT OFFICE.

ROBERT B. WILLIAMSON, OF MILWAUKEE, WISCONSIN, ASSIGNOR, BY MESNE ASSIGNMENTS, TO ALLIS-CHALMERS MANUFACTURING COMPANY, A CORPORATION OF DELAWARE.

DYNAMO-ELECTRIC MACHINE.

1,157,137.  Specification of Letters Patent.  Patented Oct. 19, 1915.

Application filed July 28, 1911. Serial No. 641,137.

*To all whom it may concern:*

Be it known that I, ROBERT B. WILLIAMSON, a citizen of the United States, residing at Milwaukee, in the county of Milwaukee and State of Wisconsin, have invented certain new and useful Improvements in Dynamo-Electric Machines, of which the following is a full, clear, and exact specification.

This invention relates to dynamo-electric machines, and particularly to means for diminishing the amount of noise created in the operation of such machines.

There is more or less humming and buzzing created in the operation of high speed dynamo-electric machines. This is especially true where a forced circulation is used; that is, where ventilating air is forced through the various parts of the machine to maintain it in a cool operating condition. This is found to be the case in the operation of high speed turbo-generators. The noise may be set up by currents of air which are blown in a radial or approximately radial direction through the ventilating spaces formed in the cores, and between the core and windings. Air currents, produced by projections on the rotor surface or by a fan on the rotor, which is provided for cooling purposes, and having a radial direction or one having a radial component, are a considerable source of these objectionable noises in that they use, as paths, the ventilating openings of the stator and, to some extent, the passages between the coils of the stator winding. When the rotor reaches a high rate of rotation, the air currents set up are of comparatively great intensity, and as these currents of air are forced against the surrounding windings of the stator, in and through ventilating openings in and adjacent its core, and against any other portions which do not form a smooth cylindrical surface, humming or buzzing within the machine is rendered audible. In fact, a regular siren effect is produced, at times.

It is therefore the object of this invention to prevent or diminish noises set up by the action of air currents in dynamo-electric machines, without preventing the efficient cooling thereof. This object is accomplished by providing the end portions of the stator with means to obstruct the passage of air currents, having a more or less radial direction, through the spaces between those portions of the winding that extend beyond the core and overlie ventilating openings in the stator. By the employment of this means a continuous cylindrical surface is provided beyond the laminæ of the stationary core, thereby obviating any undesirable noise.

The invention is illustrated on the accompanying sheet of drawings, in which—

Figure 2:
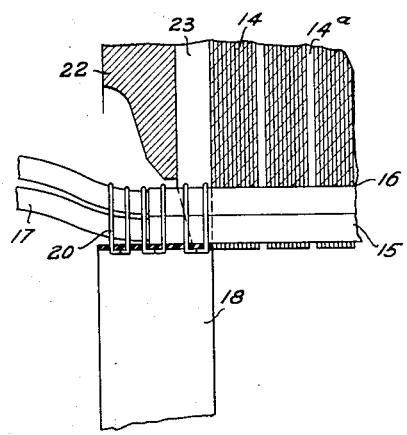
Figure 3:
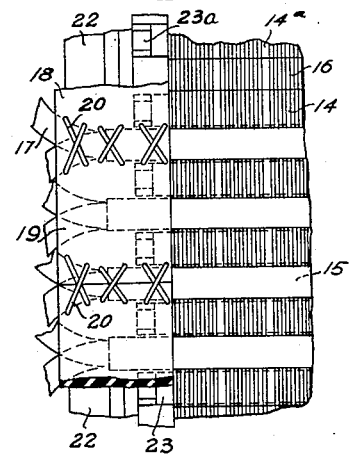

Figure 1 is a front elevation, parts being broken away and in section, of a high speed dynamo-electric machine equipped with my invention. Figs. 2 and 3 are fragmentary elevations of a portion of the stator core with its windings showing an application of my invention.

The various novel features of my invention will be apparent from the drawings and specification and will be particularly pointed out in the appended claims.

While my invention is particularly useful in connection with high speed dynamo-electric machines, it is not limited to that particular use, for it may find application in connection with various types of dynamo-electric machines and electric apparatus wherein ventilating currents are circulated.

In Fig. 1 a high speed turbo-generator having an outer casing 10, a rotor 11, and stator 12, is shown. The rotor is provided with fans 13 which together with the movement of the rotor cause a circulation of cooling fluid through and around the stationary parts of the machine. The stator comprises a laminated core 14, the laminæ being spaced in groups in a manner to form ventilating passageways 14ª, and windings 15 located in slots 16 of said core and having end turns 17 which project beyond the ends of said core. The laminated core is held between end-heads 22 (only one of which is here shown), and interposed between the end-heads and core are segments 23, provided with ventilating openings, shown as channels 23ª, extending longitudinally throughout the length of the segments and radially disposed when the parts are assembled.

Currents of air set up and forced by the rotor 11 and fans 13 against the end turns 17 of the stator winding, end heads 22 and against and through the ventilating segments 23 at the ends of the stator core cause a noise the intensity of which increases with the speed of the machine. In order to prevent the noise thus occasioned, an annular band or member 18 is placed over and secured to portions of the winding to block the passage of circulating air to the end heads, ventilating segments, and portions of the end turns 17 directly from the rotor and fans, where the greatest amount of noise is produced. These bands, which may be distributed along the stationary element of the machine, comprise in this particular case pieces or sections 19 of suitable material, preferably a tough insulating material such as leatheroid, fish paper, etc., laced together to form a complete ring around the portion of the end turns directly adjacent the stator core 14. These noise-preventing rings 18 may be held in place by any suitable means, but I prefer to secure them to the end turns 17 with lacing material 20.

It will be apparent that the stuffing-ring 18 is capable of obstructing the openings between the segments 23 and the openings through the segments from the passage of fluid currents, produced by the rotor and having a more or less radial direction; and since currents of this nature may produce very disagreeable noises when the machine is operating at high speed, the utility of the stuffing ring 18 will be obvious. The channels in the segments and the openings between adjacent segments are open to the passage of cooling currents which enter in an axial direction on the outside of the shield 18. Such cooling currents do not have any appreciable effect of producing disagreeable noises during the operation of the machine.

There may be other modifications and arrangements of the invention which have not been here particularly shown and described, and I intend to cover all such modifications and arrangements which do not involve a departure from the spirit and scope of my invention as set forth in the following claims.

What I claim as new is:

1. In a dynamo-electric machine, a core, windings carried by said core, and means secured to said windings to diminish the noise set up by fluid circulation within said machine.

2. In a dynamo-electric machine, the combination of a core having a winding and ventilating passageways, and means secured to said winding for diminishing the noise set up by fluid circulation within said machine.

3. In a dynamo-electric machine, the combination of a core, conductors carried thereby, ventilating segments secured to the ends of said core adjacent said conductors, and means obstructing the spaces between said conductors and opposite said ventilating segments.

4. In a dynamo-electric machine, the combination of a core, segments provided with ventilating openings secured to the ends of said core, windings carried by said core, and means for preventing the circulation of fluid currents through said ventilating segments and portions of said windings in a radial direction.

5. In a dynamo-electric machine, the combination of a core, means for maintaining said core in position, said means having ventilating passageways therein, and a winding, portions of which extend beyond the end of said core forming passageways for circulating fluid currents, and means for covering said last mentioned passageways opposite said ventilating passageways.

6. In a dynamo-electric machine, the combination of a laminated core, segments exterior to said core, and having ventilating passageways, windings carried by said core, the end turns of which form air passageways with said ventilating segments, and means secured to said windings obstructing said passageways, said means comprising an annular member.

7. In a dynamo-electric machine, the combination of a laminated core, segments exterior to said core and having ventilating passageways, windings carried by said core, the end turns of which form passageways with said ventilating passageways, and means secured to said windings obstructing said passageways, said means comprising segmental portions secured together.

8. In a dynamo-electric machine, the combination of a core, ventilating segments exterior to said core, windings carried by said core, the end turns of which form air passageways with said ventilating segments, and means secured to said windings obstructing said passageways, said means comprising a plurality of pieces of insulating material laced together to form an annular member.

9. In a dynamo-electric machine, the combination of a laminated core, means for retaining said core in place, windings carried by said core, portions of which project beyond said core, said means and windings forming passageways for a ventilating current circulated in said machine, and means to block said passageways to prevent a noise in the operation of said machine.

10. In a dynamo-electric machine, a stator, a rotor, one of said parts being provided with ventilating openings adjacent an edge and with windings the end turns of which are disposed adjacent said ventilating openings, and means obstructing the passage of air through said ventilating openings and said end turns for preventing noise in the operation of the machine.

11. In a dynamo-electric machine, a core provided with ventilating openings and windings, spaces between said windings forming passageways with said ventilating openings, and means obstructing the passage of ventilating currents through said openings and said windings.

12. In a dynamo-electric machine, the combination of a stator element provided with ventilating openings, spaced conductors carried by said element, said ventilating openings being in alinement with the spaces between adjacent conductors, and means secured in position relatively to said stator element for obstructing the passage of ventilating fluid through said spaces between said conductors to diminish the noise set up by fluid circulation in said machine.

13. In a dynamo-electric machine, the combination of a stator element, spaced conductors carried by a core portion of said stator element and extending axially beyond said core portion, the radially outer side of portions of said conductors immediately adjacent said core portion being unsupported, and means associated with said stator element for obstructing the spaces between said unsupported portions of said conductors to diminish noise set up by fluid circulation in said machine.

14. In a dynamo-electric machine, the combination of a stator core, a winding disposed in slots in said core and projecting axially beyond said core, and means fixed in position and disposed radially within projecting portions of said windings adjacent said core for obstructing the passage of air currents to the spaces between said projecting portions.

Milwaukee, Wis., July 25, 1911.

In testimony whereof I affix my signature, in the presence of two witnesses.

ROBERT B. WILLIAMSON.

Witnesses:
 Chas. L. Byron,
 Rob. E. Stoll.

Copies of this patent may be obtained for five cents each, by addressing the "Commissioner of Patents, Washington, D. C."